(12) United States Patent
Tokuno et al.

(10) Patent No.: US 9,292,041 B2
(45) Date of Patent: Mar. 22, 2016

(54) TOUCH PANEL AND METHOD OF MANUFACTURING TOUCH PANEL

(71) Applicant: Nissha Printing Co., Ltd., Kyoto-shi (JP)

(72) Inventors: Katsumi Tokuno, Kyoto (JP); Kazuhiko Takahata, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 14/426,550

(22) PCT Filed: Sep. 19, 2013

(86) PCT No.: PCT/JP2013/075255
§ 371 (c)(1),
(2) Date: Mar. 6, 2015

(87) PCT Pub. No.: WO2014/046160
PCT Pub. Date: Mar. 27, 2014

(65) Prior Publication Data
US 2015/0241907 A1 Aug. 27, 2015

(30) Foreign Application Priority Data

Sep. 24, 2012 (JP) .................................. 2012-209101

(51) Int. Cl.
*G06F 1/00* (2006.01)
*G06F 1/16* (2006.01)
*G06F 3/044* (2006.01)
*G06F 3/041* (2006.01)

(52) U.S. Cl.
CPC ........ *G06F 1/16* (2013.01); *G06F 3/041* (2013.01); *G06F 3/044* (2013.01); *G06F 2203/04103* (2013.01)

(58) Field of Classification Search
CPC ................. H01L 2924/00; H01L 2224/48227; G06F 3/0288; G06F 3/041; G06F 1/00; G06F 17/5068
See application file for complete search history.

(56) References Cited

U.S. PATENT DOCUMENTS

2013/0320547 A1* 12/2013 Zhang ................. H01L 23/5389
257/766

FOREIGN PATENT DOCUMENTS

| JP | 2008129708 A | 6/2008 |
|----|--------------|--------|
| JP | 201061425 A | 3/2010 |
| JP | 201113725 A | 1/2011 |
| JP | 201120333 A | 2/2011 |
| JP | 3167700 U | 4/2011 |
| JP | 2012118762 A | 6/2012 |

* cited by examiner

*Primary Examiner* — Michael Faragalla
(74) *Attorney, Agent, or Firm* — The Webb Law Firm

(57) ABSTRACT

A touch panel includes a substrate, a first adhesive layer stacked on the substrate, a first conductive layer stacked on the first adhesive layer and having a first electrode pattern, a second adhesive layer stacked on the first adhesive layer and the first conductive layer, and a second conductive layer stacked on the second adhesive layer and having a second electrode pattern. The first electrode pattern includes first island-like electrode portions and first connecting portions electrically interconnecting the first island-like electrode portions. The second electrode pattern includes a plurality of second island-like electrode portions formed in a spaced apart relationship in a second direction intersecting a first direction so as not to be overlapped with the first electrode pattern, and second connecting portions electrically interconnecting the second island-like electrode portions over via the first connecting portions.

3 Claims, 11 Drawing Sheets (a)

(b)

(c)

(a)

(b)

US 9,292,041 B2

TOUCH PANEL AND METHOD OF MANUFACTURING TOUCH PANEL

CROSS-REFERENCE TO RELATED APPLICATIONS

This application is the United States national phase of International Application No. PCT/JP2013/075255 filed Sep. 19, 2013, and claims priority to Japanese Patent Application No. 2012-209101 filed Sep. 24, 2012, the disclosures of which are hereby incorporated in their entirety by reference.

TECHNICAL FIELD

The present invention relates to a touch panel, more particularly, to a touch panel having patterns formed and visually recognizable thereon.

RELATED ART

Conventionally, there have been devised a variety of touch panels. For instance, there is known an electrostatic capacitance or capacitance type touch panel including a plurality of electrodes formed to cross each other via an insulating layer. In this, when a finger or the like is placed near the panel forming the electrodes, a capacitance is generated between the electrodes of the panel and a current charging the generated capacitance is detected, thus effecting position detection. Among the electrostatic capacitance type touch panels, there is known in particular an electrostatic capacitance touch panel having two crossed electrodes stacked on one face thereof (see e.g. Patent Document 1). Meanwhile, this electrostatic capacitance touch panel is fabricated with using multiple transfer sheets each having an adhesive layer and a conductive layer on a substrate (see e.g. Patent Document 2).

FIG. 11 is a plan view of a conventional touch panel. FIG. 12 is section view of the touch panel shown in FIG. 11 along A-A'. FIG. 13 is section view of the touch panel shown in FIG. 11 along B-B'. As shown in FIG. 11, this conventional touch panel 500 comprises a substrate 501, and comprises also a first electrode 510 and a second electrode 520 which are formed on the substrate 501. The first electrode 510 and the second electrode 520 each comprises a plurality of first electrode patterns 530 and a plurality of second electrode patterns 540. The first electrode pattern 530 includes rhombus-shaped island-like electrode portions 531 and first connecting portions 532 electrically connecting the first island-like electrode portions 531 to each other. The second electrode pattern 540 includes rhombus-shaped island-like electrode portions 541 provided at regions where the first island-like electrode portions 531 are not formed and second connecting portions 542 electrically connecting the second island-like electrode portions 541 to each other. Incidentally, as shown in FIG. 12 and FIG. 13, the first electrode pattern 530 includes an adhesive layer 511 and a conductive layer 512 and the second electrode pattern 540 includes an adhesive layer 521 and a conductive layer 522.

PRIOR-ART DOCUMENTS

Patent Documents

Patent Document 1: Japanese Unexamined Patent Application Publication No. 2011-13725
Patent Document 2: Japanese Unexamined Patent Application Publication No. 2011-20333

SUMMARY

Problem to be Solved by Invention

However, in the case of the above-described configuration, as shown in FIG. 12 and FIG. 13, the first electrode pattern 530 includes the adhesive layer 511 and the conductive layer 512 and the second electrode pattern 540 includes the adhesive layer 521 and the conductive layer 522. And, the first electrode pattern 530 and the second electrode patterns 540 are formed only at some portions of the substrate 501. Accordingly, there is formed a significant level difference between a portion where the first electrode pattern 530 or the second electrode pattern 540 is formed and a portion where such pattern 530 or 540 is not formed. Consequently, the pattern shapes of the first electrode pattern 530 and the second electrode pattern 540 are visually recognized, so that the pattern visual recognizability becomes considerable.

Then, the object of the present invention is to provide a touch panel having electrode patterns formed visually unrecognizable.

Solution to the Problem

According to a first characterizing feature of the present invention, there are provided;
a substrate;
a first adhesive layer stacked on one face of the substrate;
a first conductive layer stacked on the first adhesive layer and having a first electrode pattern;
a first dummy layer formed at a region in a same plane as the first conductive layer where the first conductive layer is absent, the first dummy layer being stacked as being spaced apart from the first conductive layer so as not to be electrically connected with the first conductive layer, the first dummy layer having a same thickness as the first conductive layer;
a second adhesive layer stacked on the first conductive layer, the first adhesive layer and the first dummy layer;
a second conductive layer stacked on the second adhesive layer and having a second electrode pattern;
a second dummy layer formed at a region in a same plane as the second conductive layer where the second conductive layer is absent, the second dummy layer being stacked as being spaced apart from the second conductive layer so as not to be electrically connected with the second conductive layer, the second dummy layer having a same thickness as the second conductive layer;
the first electrode pattern including:
a plurality of first island-like electrode portions formed in a spaced-apart relationship with each other in a first direction on the substrate; and
a first connecting portion formed between the first island-like electrode portions which are adjacent each other in the first direction, the first connecting portion electrically interconnecting the first island-like electrode portions; and
the second electrode pattern including:
a plurality of second island-like electrode portions formed in a spaced-apart relationship with each other in a second direction intersecting the first direction so as not to be overlapped with the first electrode pattern on the substrate; and
a second connecting portion formed between the second island-like electrode portions which are adjacent each other in the second direction, the second connecting portion electrically interconnecting the second island-like electrode portions over via the first connecting portion;

the first adhesive layer including a first groove portion formed at a boundary region between the first conductive layer and the first dummy layer and on a surface of the side on which the first conductive layer and the first dummy layer are stacked; and the second adhesive layer including a second groove portion formed at a boundary region between the second conductive layer and the second dummy layer and on a surface of the side on which the second conductive layer and the second dummy layer are stacked.

With the inventive configuration described above, in a region where the first conductive layer is not stacked, there is stacked a first dummy layer having a same thickness as the first conductive layer. With this, due to the first dummy layer, the level difference generated as the result of stacking of the first conductive layer is reduced. Accordingly, it becomes possible to suppress the visual recognizability of the pattern shape of the first electrode pattern 21 provided in the first conductive layer 5. Further, in a region where the second conductive layer is not stacked, there is stacked a second dummy layer having a same thickness as the second conductive layer. With this, due to the second dummy layer, the level difference generated as the result of stacking of the second conductive layer is reduced. Accordingly, it becomes possible to suppress the visual recognizability of the pattern shape of the second electrode pattern provided in the second conductive layer.

Further, with the inventive configuration described above, a first groove portion is provided at a boundary region between the first conductive layer and the first dummy layer, so that it is possible to prevent the first dummy layer and the first conductive layer from coming into contact with each other. Further, thanks to the formation of the first groove portion at the boundary region between the first conductive layer and the first dummy layer, even if the touch panel is flexed vertically relative to the substrate, the first groove portion will act as a play portion, thus suppressing a force applied thereto in the vertical direction. Further, a second groove portion is provided at a boundary region between the second conductive layer and the second dummy layer. This second groove portion acts in the same principle as the first groove portion and has a similar function. Therefore, with the above-described configuration, the inventive touch panel has superior insulating performance and flexibility.

According to a second characterizing feature of the present invention:

at the boundary region between the first conductive layer and the first dummy layer, a level difference of the first groove portion formed by the first conductive layer, the first dummy layer and the first adhesive layer ranges from 0.01 µm to 5.0 µm; and at the boundary region between the second conductive layer and the second dummy layer, a level difference of the second groove portion formed by the second conductive layer, the second dummy layer and the second adhesive layer ranges from 0.01 µm to 5.0 µm.

With the above-described configuration, at the boundary region between the first conductive layer and the first dummy layer, a level difference formed by the first conductive layer, the first dummy layer and the first groove portion of the first adhesive layer ranges from 0.01 µm to 5.0 µm. Incidentally, if the level difference were less than 0.01 µm, there would occur electric short-circuiting. Conversely, if the level difference exceeded 5.0 µm, the first electrode pattern of the first conductive layer and the first dummy pattern of the first dummy layer would become visually recognizable. Moreover, regarding the boundary region between the second conductive layer and the second dummy layer too, an arrangement is made such that the level difference formed by the second conductive layer, the second dummy layer and the second groove portion of the second adhesive layer ranges from 0.01 µm to 5.0 µm. Incidentally, if the level difference were less than 0.01 µm, there would occur electric short-circuiting. Conversely, if the level difference exceeded 5.0 µm, the second electrode pattern of the second conductive layer and the second dummy pattern of the second dummy layer would become visually recognizable.

According to a third characterizing feature of the present invention:

a thickness of the second adhesive layer is from 1 to 100 times as large as the level difference of the first groove portion.

With the above-described configuration, the second adhesive layer has a thickness which is from 1 to 100 times as large as the level difference of the first groove portion. With this configuration, it becomes possible to cause the level difference generated due to the provision of the first groove portion to be "absorbed" by the thickness of the second adhesive layer. As a result, it becomes possible to suppress the visual recognizability of the first electrode pattern of the first conductive layer and the first dummy pattern of the first dummy layer on the touch panel.

EMBODIMENTS OF THE INVENTION

Next, embodiments of the present invention will be explained in greater details with reference to the accompanying drawings. It is understood that unless indicated otherwise, the sizes, materials, shapes, relative positions of various parts or portions described in the following embodiments of the present inventions are not for limiting the scope of this invention, but merely for illustrating the invention.

First Embodiment

1. Configuration of Touch Panel

Figure 1:
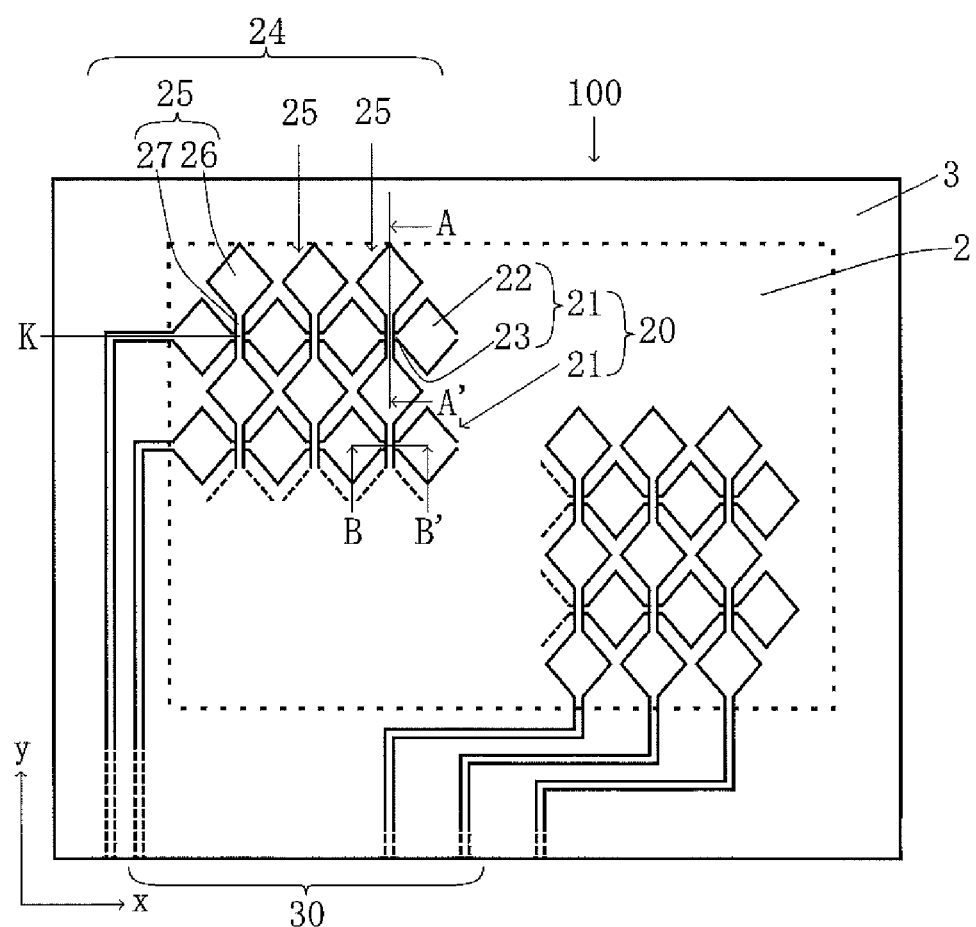
FIG. 1 is a plan view of a touch panel according to the present invention.
Figure 2:
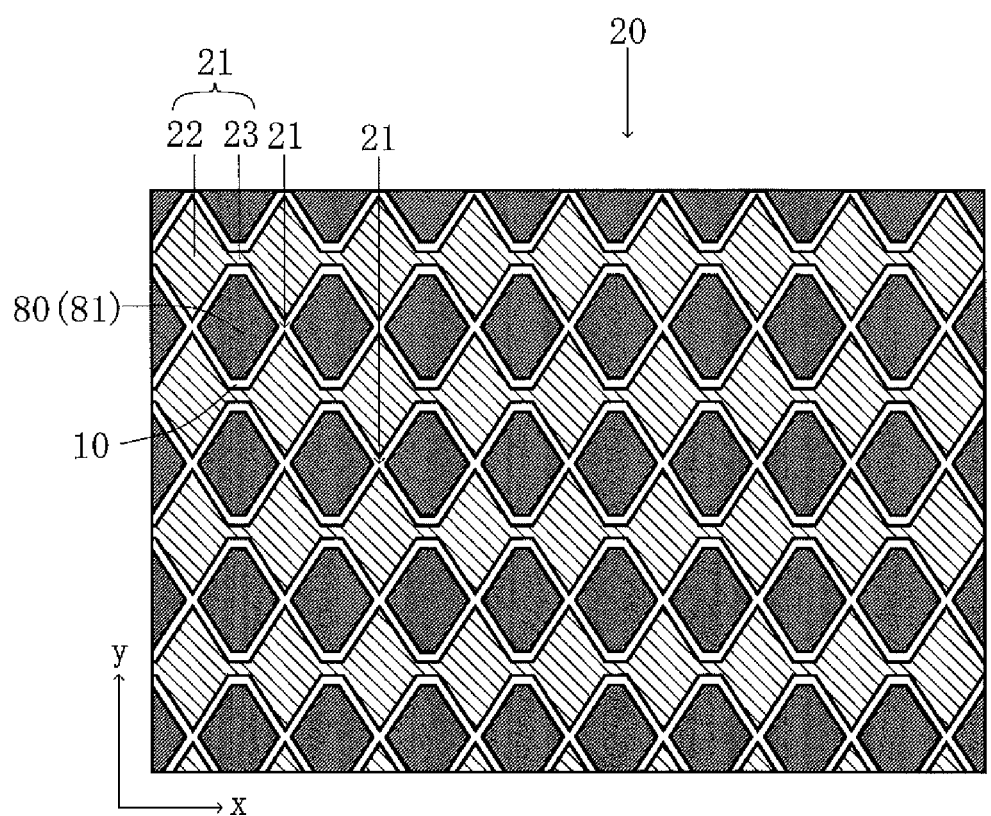
FIG. 2 is a plan view showing a first electrode of the touch panel according to the present invention.
Figure 3:
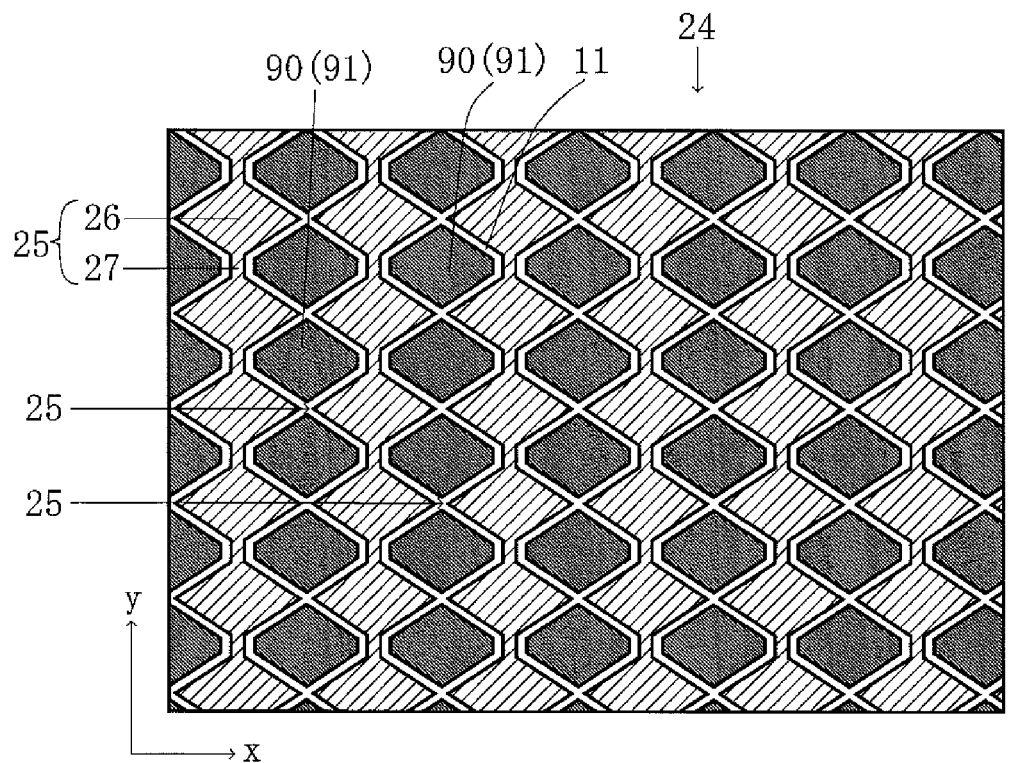
FIG. 3 is a plan view showing a second electrode of the touch panel according to the present invention.

Firstly, there will be explained a configuration of a touch panel relating to this embodiment. FIG. 1 shows a configuration of the touch panel. FIG. 2 is a plan view showing a first electrode and FIG. 3 is a plan view showing a second electrode.

As shown in FIG. 1, a touch panel 100 includes an input region 2 and a circumferential edge portion 3. In FIG. 1, the input region 2 is a region surrounded by two-dot chain lines and this is a region for detecting finger position information inputted to the touch panel 100. In the input region 2, there are disposed an X electrode 20 along an X direction as a first electrode and a Y electrode 24 along a Y direction as a second electrode, respectively.

As shown in FIG. 2, the X electrode 20 includes a first electrode pattern(s) 21 and a first dummy pattern(s) 80. The X electrode 20 further includes trench-like first groove portions 10 provided between the first electrode pattern 21 and the first dummy pattern 80 for insulating these from each other.

Incidentally, in the X electrode 20, the first electrode patterns 21 are a plurality of such patterns spaced apart from each other along the Y axis direction. The first dummy patterns 80 are arranged to be present and extend in regions where the first electrode patterns 21 are not formed and a plurality of such first dummy patterns 80 are disposed in alternation with the first electrode patterns 21 in the Y axis direction. Meanwhile, the first groove portion 10 is formed at the boundary region between the first electrode pattern 21 and the first dummy pattern 80.

Incidentally, the first electrode pattern 21 includes a plurality of first island-like electrode portions 22 disposed along the X axis direction as a first direction and first connecting portions 23 for electrically connecting the adjacent first island-like electrode portions 22 to each other. Each first island-like electrode portion 22 is provided in the form of a rectangle having one diagonal line thereof aligned along the X axis.

Further, the first dummy pattern 80 is comprised of a plurality of first island-like dummy portions 81 disposed along the X axis direction. Meanwhile, the first island-like dummy portion 81 has a polygonal shape and is disposed in such a manner as not to be physically or electrically connected to the first island-like electrode portion 22, the first connecting portion 23 or the other first island-like dummy portion 81. With the above-described configuration of the first dummy pattern 80, the pattern shape of the first electrode pattern 21 is rendered less visually recognizable.

As shown in FIG. 3, the Y electrode 24 includes a second electrode pattern(s) 25, a second dummy pattern(s) 90 and a second adhesive layer 6 stacked upon the entire X electrode 20. The Y electrode 24 further includes a trench-like second groove portion 11 provided between the second electrode pattern 25 and the second dummy pattern 90 for insulating these from each other.

Incidentally, in the Y electrode 24, the second electrode patterns 25 are a plurality of such patterns spaced apart from each other along the X axis direction. The second dummy patterns 90 are arranged to be present and extend in regions where the second electrode patterns 25 are not formed and a plurality of such second dummy patterns 90 are disposed in alternation with the second electrode patterns 25 in the X axis direction. Meanwhile, the second groove portion 11 is formed at the boundary region between the second electrode pattern 25 and the second dummy pattern 90.

Incidentally, the second electrode pattern 25 includes a plurality of second island-like electrode portions 26 disposed along the Y axis direction as a second direction and second connecting portions 27 for electrically connecting the adjacent second island-like electrode portions 26 to each other. Each second island-like electrode portion 26 is provided in the form of a rectangle having one diagonal line thereof aligned along the Y axis.

Incidentally, as seen in a plan view, the first island-like electrode portions 22 and the second island-like electrode portions 26 are disposed with an offset to each other (in a checkerboard pattern); and in the input region 2, the first and second island-like electrode portions 22, 26 having the rectangular shapes are arranged in a matrix form as seen in the plan view. And, as shown in FIG. 1, the first electrode pattern 21 and the second electrode pattern 25 are caused to intersect each other at intersection portions K within the input region 2, with the first connecting portions 23 and the second connecting portions 27 being caused to intersect each other.

Further, as seen in the plan view, the second island-like electrode portions 26 are disposed at positions overlapped with the first island-like dummy portions 81 in the X axis direction and the Y axis direction. With this arrangement, the first electrode pattern 21 is rendered less visually recognizable.

Further, the second dummy pattern 90 is comprised of a plurality of second island-like dummy portions 91 disposed along the Y axis direction. Meanwhile, the second island-like dummy portion 91 has a polygonal shape and is disposed in such a manner as not to be physically or electrically connected to the second island-like electrode portion 26, the second connecting portion 27 or the other second island-like dummy portions 91. With the above-described configuration of the second dummy pattern 90, the pattern shape of the second electrode pattern 25 is rendered less visually recognizable.

Further, as seen in the plan view, the second island-like dummy portions 91 are disposed at positions overlapped with the first island-like electrode portions 22 in the X axis direction and the Y axis direction. With this arrangement, the first electrode pattern 21 is rendered less visually recognizable.

Meanwhile, as shown in FIG. 1, in the circumferential edge portion 3, there is disposed a leading circuit 30. This leading circuit 30 is connected to the X electrode 20 and the Y electrode 24 and is connected with a driving section and an electric signal converting/calculating section (neither being shown) provided inside the touch panel 100 or an external device.

2. Cross-Sectional Structure of Touch Panel (Y Axis Direction)

Figure 4:
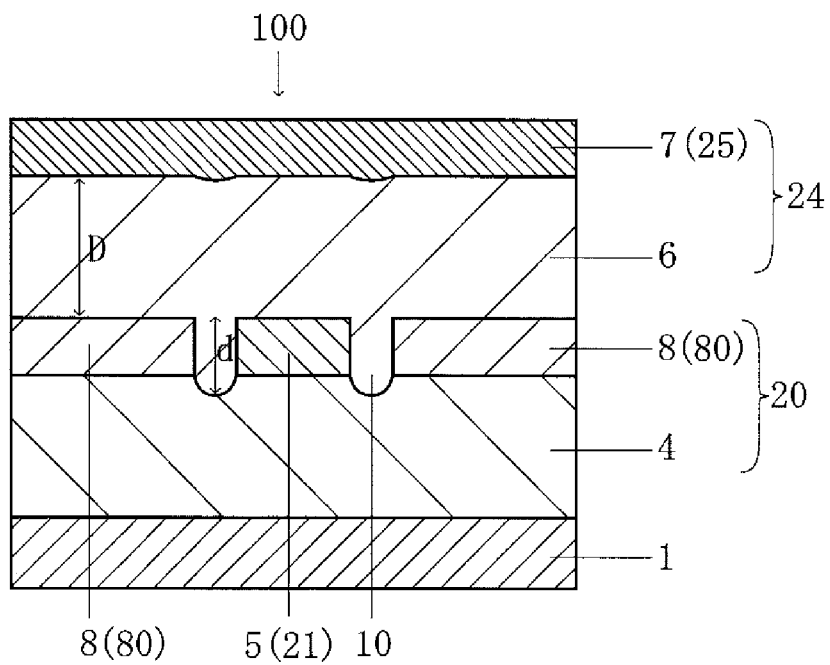
FIG. 4 is a section view along A-A' in FIG. 1.

Next, the structure of the touch panel 100 as seen in its cross section will be explained. Firstly, the structure of the touch panel 100 in the A-A' direction (Y axis direction) will be explained. FIG. 4 shows a section along A-A' in FIG. 1. As shown in FIG. 4, in the above direction, the X electrode 20 is provided on one face of the substrate 1, and the Y electrode 24 is provided on this X electrode 20.

The X electrode 20 includes a first adhesive layer 4 disposed on the entire face of the substrate 1, a first conductive layer 5 stacked on the first adhesive layer 4 and constituting the first electrode pattern 21, and a first dummy layer 8 spaced apart from the first conductive layer 5 and constituting the first dummy pattern 80.

As described above, in the X electrode 20, the first adhesive layer 4 is provided on the entire face of the substrate 1 and the first conductive layer 5 is provided thereon. With this, a thickness difference between the portion where the first conductive layer 5 is present and the portion where the first conductive layer 5 is absent is made smaller than in the conventional touch panel 500. As a result, in this touch panel 100, the pattern shape of the first electrode pattern 21 of the first conductive layer 5 is rendered less visually recognizable.

Further, at the portion adjacent the first conductive layer 5, there is provided the first dummy layer 8 having the same thickness as the first conductive layer 5. Then, due to the first dummy layer 8, the level difference generated in association with provision of the first conductive layer 5 is reduced. Therefore, the pattern shape of the first electrode pattern 21 is rendered less visually recognizable on the touch panel 100.

Meanwhile, at the boundary region between the first conductive layer 5 and the first dummy layer 8 and on the side of surface of the first adhesive layer 4 on which the first dummy layer 8 is formed, a first groove portion 10 is provided. With this, the first conductive layer 5 and the first dummy layer 8 are electrically and physically isolated from each other.

Here, the language "boundary region" means a region in the X electrode 20 where neither the first conductive layer 5 nor the first dummy layer 8 are provided, but the first adhesive layer remains exposed, as shown in FIG. 4. Meanwhile, the first groove portion 10 is a trench-like recess. And, as being provided at the above-described boundary region, the first groove portion 10 serves to prevent contact between the first conductive layer 5 and the first dummy layer 8. Moreover, thanks to formation of this first groove portion 10, even if the touch panel 100 is flexed vertically relative to the substrate 1, the first groove portion 10 will act as a "play portion", thus suppressing a force applied thereto in the vertical direction. As a result, the touch panel 100 is provided with good flexibility.

Further, the Y electrode 24 includes a second adhesive layer 6 provided on the entire face of the X electrode 20, and a second conductive layer 7 provided on the second adhesive layer 6 and constituting the second electrode pattern 25.

As shown in FIG. 4, the second adhesive layer 8 is configured to have a thickness D which is greater than a level difference (d) formed by the first conductive layer 5, the first dummy layer 8, and the first groove portion 10 of the first adhesive layer 4. More particularly, the above-described thickness D is from 1 to 100 times as large as the thickness (d).

With the above-described configuration, the thickness of the second adhesive layer 6 serves to "absorb" the level difference generated by the provisions of the first conductive layer 5, the first dummy layer 8 and the first groove portion 10. Consequently, the pattern shapes of the first electrode pattern 21 of the first conductive layer 5 and the first dummy pattern 80 of the first dummy layer 8 are rendered less visually recognizable on the touch panel 100.

As described above, in the touch panel 100 according to the present invention, in the Y axis direction, on the X electrode 20 having the reduced level difference, there is provided the Y electrode 24 serving to "absorb" the level difference of the X electrode 20. As a result, with this touch panel 100, in the Y axis direction, the pattern shapes of the first electrode pattern 21 and the first dummy pattern 80 are rendered less visually recognizable.

That is, in the touch panel 100 of the present invention, in the X electrode 20, the first adhesive layer 4 is provided over the entire surface thereof, and the first conductive layer 5 and the first dummy layer 8 are provided thereon. With this, the level difference generated on the X electrode 20 is minimized. And, as the generated level difference is "absorbed" by the thickness of the second adhesive layer 6 of the Y electrode 24, the pattern shapes of the first electrode pattern 21 and the first dummy pattern 80 are rendered less visually recognizable.

3. Cross-Sectional Structure of Touch Panel (X Axis Direction)

Figure 5:
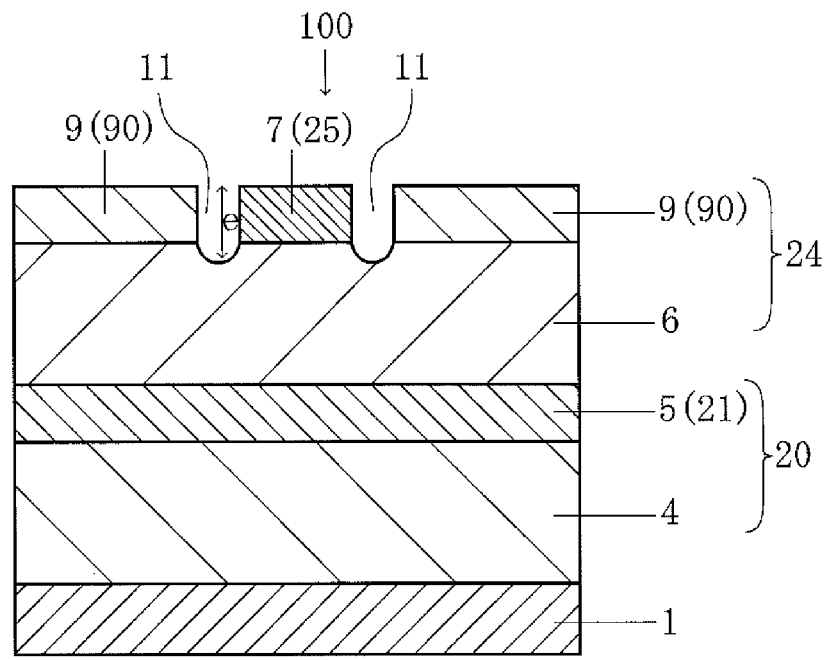
FIG. 5 is a section view along B-B' in FIG. 1.

Next, the structure of the touch panel 100 as seen in its cross section along the B-B' direction (X axis direction) will be explained. FIG. 5 shows the section along B-B' in FIG. 1. As shown in FIG. 5, in the above direction, the X electrode 20 is provided on one face of the substrate 1, and the Y electrode 24 is provided on this X electrode 20.

The X electrode 20 includes the first adhesive layer 4 provided on the entire face of the substrate 1, and the first conductive layer 5 provided on the first adhesive layer 4 and constituting the first electrode pattern 21.

The Y electrode 24 includes a second adhesive layer 6 provided on the entire face of the X electrode 20 and a second conductive layer 7 provided on the second adhesive layer 6 and constituting the second electrode pattern 25. And, at the opposed ends of the second conductive layer 7, there is provided a second dummy layer 9 spaced apart from the second conductive layer 7 and constituting the second dummy pattern 90. Further, at regions of the second adhesive layer 6 where the second conductive layer 7 and the second dummy layer 9 are absent, second groove portions 11 are provided.

As described above, as the second adhesive layer 6 is provided overall and the second conductive layer 7 is provided thereon as the Y electrode 24, the thickness difference between the portion where the second conductive layer 7 is present and the portion where the second conductive layer 7 is absent is made smaller than in the conventional touch panel 500. As a result, in this touch panel 100, the pattern shape of the second electrode pattern 25 of the first conductive layer 7 is rendered less visually recognizable.

Furthermore, at the position adjacent the second conductive layer 7, there is provided the second dummy layer 9 having the same thickness as the second conductive layer 7. This second dummy layer 9 serves to reduce the level difference generated when the second conductive layer 7 is provided. Accordingly, in this touch panel 100, the visual recognizability of the pattern shape of the second electrode pattern 25 of the second conductive layer 7 is suppressed.

Meanwhile, in the second adhesive layer 6, at the boundary regions between the second conductive layer 7 and the second dummy layer 9, the second groove portions 11 are provided so as to prevent electrical or physical connection between the second conductive layer 7 and the second dummy layer 9. Here, the language "boundary region" refers to a region in the Y electrode 24 where neither the second conductive layer 7 nor the second dummy layer 9 are provided and the second adhesive layer 6 remains exposed. Incidentally, the second groove portion 11 is a trench-like recess. And, as being provided at the above-described boundary region, the second groove portion 11 serves to prevent contact between the second conductive layer 7 and the second dummy layer 9. Moreover, thanks to formation of this second groove portion 11, even if the touch panel 100 is flexed vertically relative to the substrate 1, the second groove portion 11 will act as a "play portion", thus suppressing a force applied thereto in the vertical direction. As a result, the Y electrode 24 is provided with good flexibility.

Figure 8A:
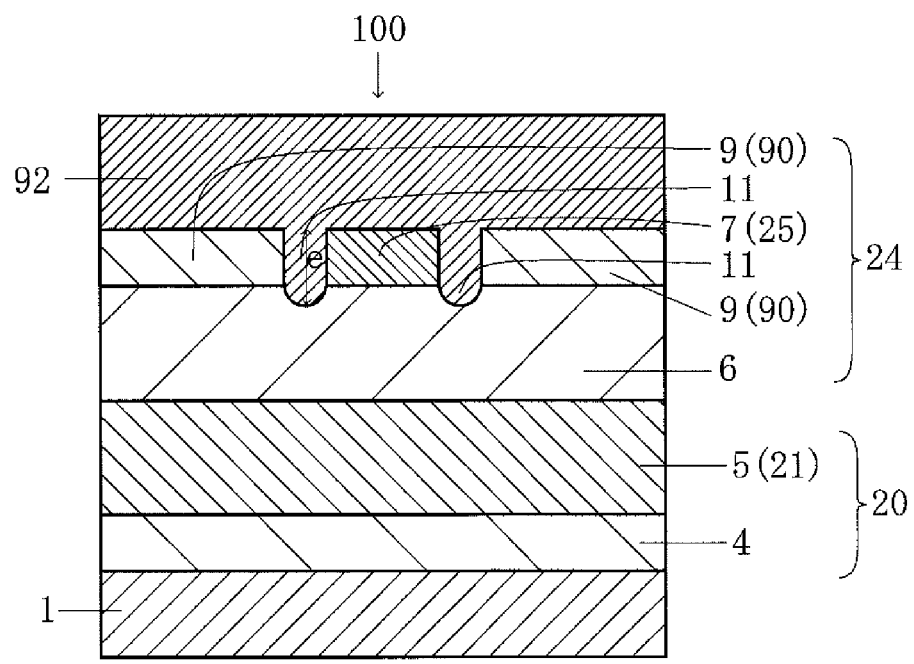
FIG. 8A is a section showing a variation of the touch panel according to the present invention.

Incidentally, at the boundary region between the second conductive layer 7 and the second dummy layer 9, the thickness (or depth) (e) of a level difference formed by the second conductive layer 7, the second dummy layer 9 and the second groove portion 11 of the second adhesive layer 6 is set to range from 0.01 µm to 5.0 µm. Accordingly, when a sealing layer 92 is provided on the Y electrode 24, the layer thickness of this sealing layer 92 can be small, thus realizing a small overall thickness, as shown in FIG. 8A.

Further, if the level difference (e) ranges from 0.01 µm to 5.0 µm, the pattern shapes of the second electrode pattern 25 and the second dummy pattern 90 are hardly visually recognizable.

Namely, with respect to the Y axis direction, in the touch panel 100 of the present invention, the second adhesive layer 6 is provided overall and the second conductive layer 7 and the second dummy layer 9 are provided thereon. With this, the level difference generated on the touch panel 100 is restricted only to the level difference (e) constituted of the second conductive layer 7, the second dummy layer 9 and the second groove portion 11, thus suppressing generation of any significant level difference on the surface of the touch panel 100.

4. Various Features of Touch Panel

The substrate 1 is an electrically insulating substrate, which can be e.g. a glass substrate, a PET (polyethylene terephthalate) film, a PC (polycarbonate) film, a COP (cycloolefin polymer) film, a PVC (polyvinyl chloride) film, a COC (cycloolefin copolymer) film, etc. In particular, a COP film is preferred as this having not only superior optical isotropy, but also superior size stability and machining accuracy. Incidentally, in case the transparent substrate 1 comprises a glass substrate, its thickness should range from 0.3 mm to 3 mm. In case the transparent substrate 1 is a resin film, its thickness should range from 20 µm to 3 mm.

The first adhesive layer 4 and the second adhesive layer 6 are layers for retaining the X electrode 20 and the Y electrode 24 on the substrate 1. As material employed for forming the first adhesive layer 4 and the second adhesive layer 6, there is employed a resin having heat sensitivity or pressure sensitivity suited to the type of the substrate 1. Specifically, a resin such as PMMA type resin, PC, polystyrene, PA type resin, polyvinyl alcohol (poval) type resin, silicone type resin, etc. will be employed. Incidentally, a heat-sensitive or pressure-sensitive resin added with photocuring property can also be employed. As some non-limiting examples of such resin added with photocuring property, there can be cited acrylic resin, styrene resin, epoxy resin, amido resin, amido epoxy resin, alkyd resin, phenol resin, ester resin, urethane resin, epoxy acrylate resin obtained by a reaction between epoxy resin and a (meta) acrylic acid, acid-modified epoxy acrylate resin obtained by a reaction between epoxy acrylate resin and acid anhydride, etc.

As a material for forming the first conductive layer 5 and the second conductive layer 7, any transparent material having conductivity can be employed as desired. As some non-limiting examples of the above material, a transparent metal oxide, a conductive material, etc. can be cited.

As one example of transparent metal oxide, ITO can be cited. As one example of conductive material, a material comprised of a photocuring resin binder and conductive nanofiber can be cited. As some examples of conductive nanofiber, there can be cited metal nanowire manufactured by continuously drawing, from its leading end, a precursor surface carrying a metal ion such as gold, silver, platinum, copper, palladium or the like with application of voltage or current thereto, or peptide nanofiber made by adding gold particles to nanofiber comprised of peptide or its derivative formed through self-organization thereof. Further, even a blackish conductive nanofiber such as carbon nanotube can be used as long as a difference of color or reflectivity relative to shadow can be found therein. Further, as examples of photocuring resin binder, urethane acrylate, cyanoacrylate, etc. can be cited.

As material for forming the first dummy layer 8 and the second dummy layer 9, those materials cited above for forming the first conductive layer 5 and the second conductive layer 7 can be employed as desired. It is preferred that the material identical to that used for forming the first conductive layer 6 and the second conductive layer 7 be employed.

The first groove portion 10 and the second groove portion 11 are to provide insulating characteristics, as well as flexibility to the touch panel 100. The sizes of the width and the depth of the first groove portion 10 and the second groove portion 11 range from 30 µm to 70 µm and from 0.8 µm to 2.0 µm, respectively.

Second Embodiment

Next, a configuration of a touch panel according to a second embodiment will be explained. The configuration of the touch panel according to the second embodiment as seen in the plan view is basically identical to that of the first embodiment. Therefore, explanation thereof will be omitted. In the following, there will be explained the configuration of the touch panel according to the second embodiment as seen in its cross section.

1. Cross-Sectional Structure of Touch Panel (Y Axis Direction)

Figure 6:
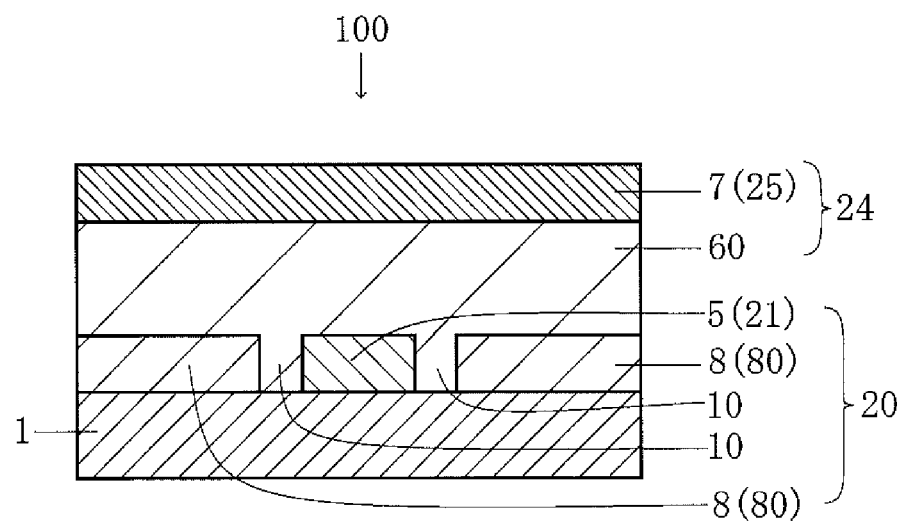
FIG. 6 is a section view along A-A' in FIG. 1.

Firstly, there will be explained the structure of the touch panel 100 according to the second embodiment in the A-A' direction (Y-axis direction). FIG. 6 shows a section along A-A' in FIG. 1 according to the second embodiment. As shown in FIG. 6, with respect to the above direction, an X electrode 20 is provided on one face of the substrate 1, and a Y electrode 24 is provided on this X electrode 20. The X electrode 20 includes a first conductive layer 5 provided on the substrate 1 and constituting a first electrode pattern 21 and a first dummy layer 8 spaced apart from the first conductive layer 5 and constituting a first dummy pattern 80.

If the first dummy layer 8 having a same thickness as the first conductive layer 8 is provided at the positon adjacent this first conductive layer 5, the first dummy layer 8 serves to reduce the level difference generated in association with provision of the first conductive layer 5. Therefore, the visual recognizability of the pattern shape of the first electrode pattern 21 of the first conductive layer 5 is suppressed.

Further, on the X electrode 20, the Y electrode 24 is provided. With respect to the above direction, the Y electrode 24 includes an adhesive layer 60 and a second conductive layer 7 constituting a second conductive pattern 25.

Meanwhile, the thickness of the adhesive layer 60 is set to be greater than the thickness of the first conductive layer 5. With this arrangement, the adhesive layer 60 serves to "absorb" a level difference formed between a portion where the first conductive layer 5 and the first dummy layer 8 are present and a portion where these are absent. As a result, in the touch panel 100, the shape of the first electrode pattern 21 of the first conductive layer 5 and the shape of the first dummy pattern 80 of the first dummy layer 8 are rendered hardly visually recognizable. Incidentally, the thickness of the adhesive layer 60 should preferably range from 2 to 100 µm. If the thickness of the adhesive layer 60 is equal to or less than 2 µm, it becomes impossible to ensure the insulation between the first conductive layer 5 and the second conductive layer 7. Conversely, if the thickness of the adhesive layer 60 exceeds 100 µm, this will impair the flexibility of the touch panel 100.

2. Cross-Sectional Structure of Touch Panel (X Axis Direction)

Figure 7:
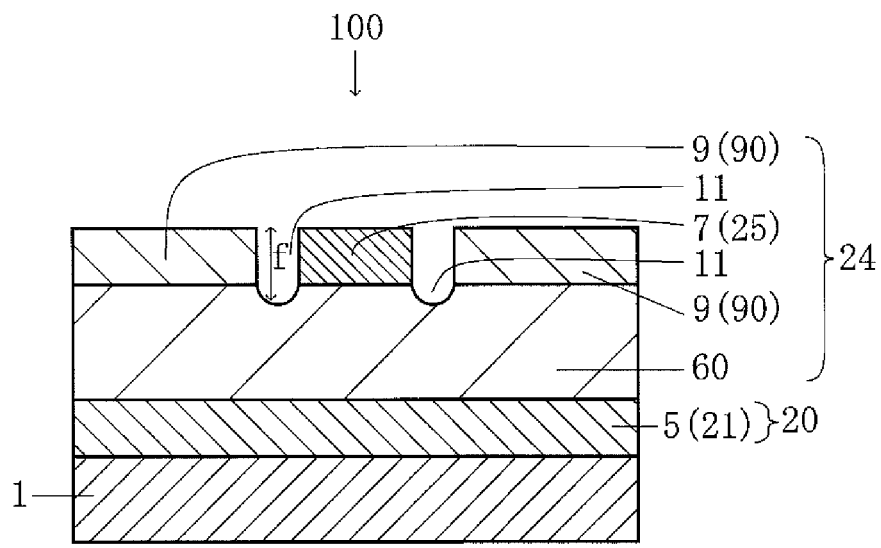
FIG. 7 is a section view along B-B' in FIG. 1.

Next, the structure of the touch panel 100 as seen in its cross section along the B-B' direction (X axis direction) will be explained. As shown in FIG. 7, in the above direction, the X electrode 20 is provided on one face of the substrate 1, and the Y electrode 24 is provided on this X electrode 20.

The X electrode 20 includes the first conductive layer 7 provided on the substrate 1.

The Y electrode 24 includes a second adhesive layer 6 provided on the entire face of the X electrode 20, a second conductive layer 7 provided on the second adhesive layer 6 and constituting the second electrode pattern 25, and a second dummy layer 9 spaced apart from the second conductive layer 7 and constituting a second dummy pattern 90. Further, at regions of the adhesive layer 6 where the second conductive layer 7 and the second dummy layer 9 are absent, second groove portions 11 are provided.

As described above, as the adhesive layer 60 is provided overall and the second conductive layer 7 provided thereon in the Y electrode 24, the difference of thickness between the portion where the second conductive layer 7 is present and the portion where it is absent is reduced as compared with the conventional touch panel 500. As a result, in this touch panel 100, the pattern shape of the second electrode pattern 25 of the second conductive layer 7 is rendered less visually recognizable.

Furthermore, at the position adjacent the second conductive layer 7, there is provided the second dummy layer 9 having the same thickness as the second conductive layer 7. This second dummy layer 9 serves to reduce the level difference generated when the second conductive layer 7 is provided. Accordingly, in this touch panel 100, the visual recognizability of the pattern shape of the second electrode pattern 25 of the second conductive layer 7 is suppressed.

Meanwhile, in the adhesive layer 60, at the boundary regions between the second conductive layer 7 and the second dummy layer 9, the second groove portions 11 are provided so as to prevent electrical or physical connection between the second conductive layer 7 and the second dummy layer 9. Here, the language "boundary region" refers to a region in the Y electrode 24 where neither the second conductive layer 7 nor the second dummy layer 9 are provided and the second adhesive layer 6 remains exposed. Incidentally, the second groove portion 11 is a trench-like recess. And, as being provided at the above-described boundary region, the second groove portion 11 serves to prevent contact between the second conductive layer 7 and the second dummy layer 9. Moreover, thanks to formation of this second groove portion 11, even if the touch panel 100 is flexed vertically relative to the substrate 1, the second groove portion 11 will act as a "play portion", thus suppressing a force applied thereto in the vertical direction. As a result, the Y electrode 24 is provided with good flexibility.

Figure 8B:
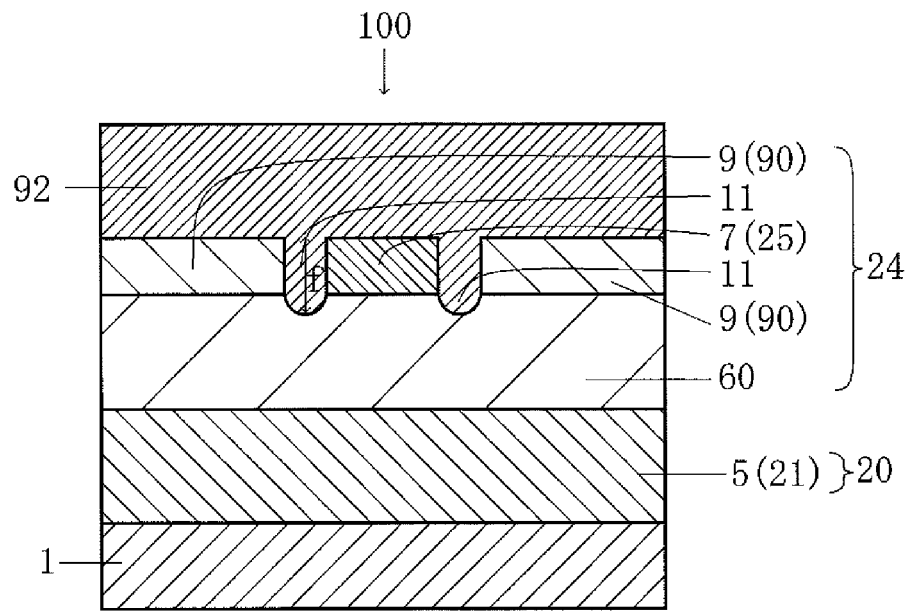
FIG. 8B is a section showing a variation of the touch panel according to the present invention.

Incidentally, the thickness (or depth) of a level difference (f) formed by the second conductive layer 7, the second dummy layer 9 and the second groove portion 11 of the second adhesive layer 6 is set to range from 0.01 µm to 5.0 µm. With this, when a sealing layer 92 is provided on the Y electrode 24, the layer thickness of this sealing layer 92 can be small, thus realizing a small overall thickness, as shown in FIG. 8B. Incidentally, the language "boundary region" refers to a region in the Y electrode 24 where neither the second conductive layer 7 nor the second dummy layer 9 are provided and the second adhesive layer 6 remains exposed.

Further, if the level difference ranges from 0.01 µm to 5.0 µm, the pattern shapes of the second electrode pattern 25 and the second dummy pattern 90 are hardly visually recognizable.

Other Embodiments

FIG. 8A is a section in the X axis direction in case the sealing layer is provided in the Y electrode according to the first embodiment. FIG. 8B is a section in the X axis direction in case the sealing layer is provided in the Y electrode according to the second embodiment.

As shown in FIG. 8A, 8B, on the Y electrode 24, there is provided the sealing layer 92. Further, the sealing layer 92 is provided with a thickness which is from 1 to 100 times as large as a level difference (e) or (f) formed by the second conductive layer 7, the second dummy layer 9, and the second groove portion 11 of the second adhesive layer 6. With the above-described arrangement, the level difference (e) or the level difference (f) generated as result of provisions of the second conductive layer 7, the second dummy layer 9 and the second groove portion 11 can be effectively "absorbed" by the thickness of the sealing layer 92. As a result, the visual recognizability of the second electrode pattern 25 of the second conductive layer 7 and the pattern shape of the second dummy pattern 90 of the second dummy layer 9 on the touch panel 100 is suppressed.

Figure 9:
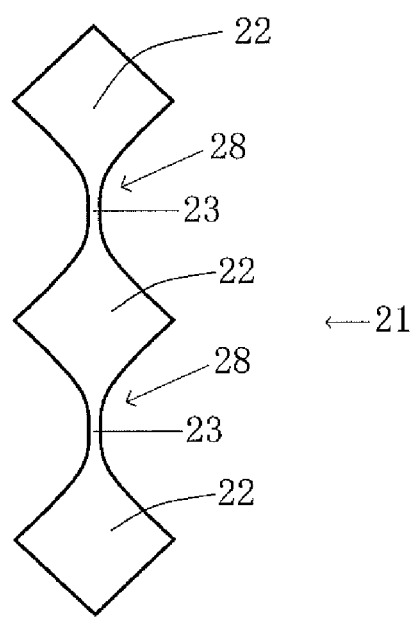
FIG. 9 is a plan view showing a variation of a first electrode pattern according to the present invention.

FIG. 9 shows a variation of the first electrode pattern. As shown in FIG. 9, the first electrode pattern 21 can be configured to smoothly connect the first island-like electrode portion 22 and the first connecting portion 23 via a connecting portion 28 like an arcuate form. With this arrangement, when a vertical force is applied to the touch panel 100, it is possible to suppress formation of a crack at the above connecting portion, which would lead to electrical disconnection. Consequently, the touch panel 100 is provided with good durability. Incidentally, if the second electrode pattern 25 of the second conductive layer 7 is provided with a similar shape as above, the durability will be further improved.

Further, in the touch panel 100 of the present invention, the first groove portion 10 can be provided on the first island-like dummy portion 81. When the first groove portion 11 is provided on the first island-like dummy portion 81, this results in division of the first island-like dummy portion 81 into multiple parts. Then, this results in increase in the area occupied by the first groove portion 11 in the touch panel 100. As a result, the touch panel 100 will be provided with even superior flexibility. Incidentally, if the second groove portion 11 is provided on the second island-like dummy portion 91, the flexibility will be even further enhanced.

Next, an example of a method of manufacturing the touch panel will be explained.

FIG. 10 is a section view illustrating a manufacturing process of the touch panel 100. The method of manufacturing the touch panel 100 according to the present invention includes first through fourth steps described below. As shown in FIG. 10A (a) and FIG. 10A (b), at a first step relating to the method of manufacturing the touch panel 100, a transfer sheet 200 including a substrate sheet 201, a conductive layer 202 stacked on the substrate sheet 201, and an adhesive layer 203 stacked on the conductive layer 202 and formed of a photo-curing resin is stacked on a substrate 1 to place the adhesive layer 203 of the transfer sheet 200 in contact with the substrate 1.

The substrate sheet 201 is a plastic film having a surface with a mold-releasing treatment. As some non-limiting examples of the plastic sheet, there can be cited polytetrafluoloethylene film, polyethyleneterephthalate film, polyethylene film, polypropylene film, polymethylpentene film, polyimide film, etc. Particularly preferred among these is a biaxially oriented polyethyleneterephthalate film having good size stability. Biaxially oriented polyethyleneterephthalate films with mold-releasing treatment are commercially available, which can be suitably used in the present invention. The mold-releasing treatment can be silicone type mold-releasing treated surface or a non-silicone type mold-releasing treated surface as well.

The material forming the conductive layer 202 comprises a same or similar material as/to the material forming the above-described first conductive layer 5 and the second conductive layer 7. The material forming the adhesive layer 203 comprises a same or similar material as/to the material forming the first adhesive layer 4 and the second adhesive layer 6.

Figure 10A:
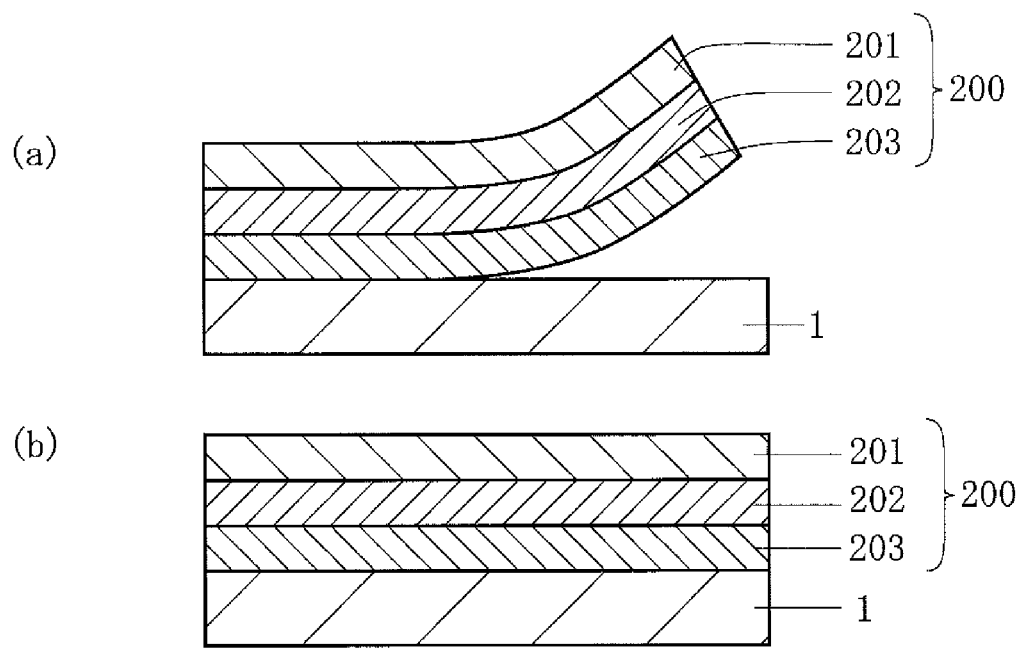
FIG. 10A is a section view illustrating manufacturing steps of the touch panel according to the present invention.

As a method of stacking the transfer sheet 200 on one face of the substrate 1, a heat-roll transfer method can be employed. The heat-roll transfer method, as illustrated in FIG. 10A (a), is a method according to which a face of the transfer sheet 200 on the side of the adhesive layer 203 is placed on the surface of the substrate 1 and then with using a transfer machine such as a roll transfer machine and an up/down transfer machine, heat and pressure are applied from the transfer sheet 200 on the side of the substrate sheet 201. With this arrangement, the transfer sheet 200 is stacked on the surface of the substrate 1 as shown in FIG. 10A (b).

Figure 10B:
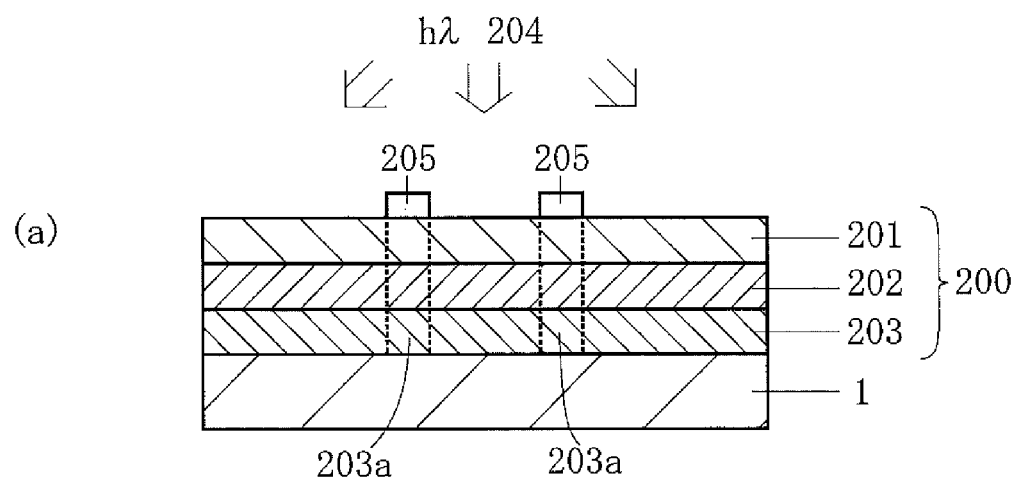
FIG. 10B is a section view illustrating manufacturing steps of the touch panel according to the present invention.
Figure 10B:
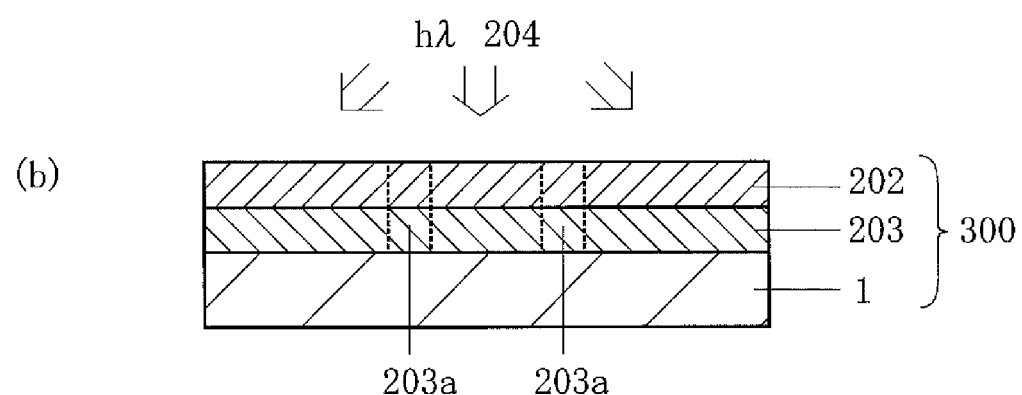
Figure 10B:
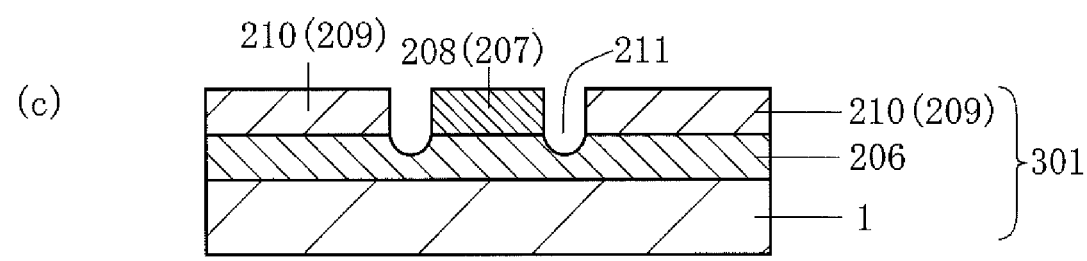

At a second step, as shown in FIG. 10B (a), on the face of the substrate sheet 201 opposite the conductive layer 202, a light-shielding layer 205 is formed, and from the substrate sheet 201 side, light beam 204 is irradiated.

The shape of the light shielding layer 205 comprises a shape formed with die-cut of the first electrode pattern 207 and the first dummy pattern 209.

With the above-described configuration of the second step, as seen in the cross section, adhesive layer portions 203a on which the light shielding layer 205 is stacked will be left uncured. Incidentally, the surfaces of the uncured adhesive layer portions 203a will be removed together with the conductive layer formed thereon, as will be explained later.

The light shielding layer 205 comprises a mask sheet or mask ink. The material forming the mask ink is not particularly limited as long as it is not dissolved in an etching process and can be any material conventionally employed for light shielding layer which resists dissolution in the etching process. The thickness of the light shielding layer 205 too is not particularly limited as long as the thickness can effectively resist dissolution in the etching process and can ensure sufficient close contact with the substrate sheet 210.

The type of light beam to be irradiated is selected from various kinds of beams such as ultraviolet beam, visually recognizable beam, infrared beam, electron beam, etc. The irradiation time ranges from 5 to 100 seconds in case of exposure of 300 J/cm$^2$ by a parallel exposing unit having an ultra-high pressure mercury lamp.

At a third step, as shown in FIG. 10B (b), on a precursor conductive substrate 300 obtained by releasing only the substrate sheet 201 from the substrate 1, the light beam 204 is irradiated from the conductive layer 202 side, thereby to cure the adhesive layer portions 203a which were uncured at the second step, except for its boundary portions with the conductive layer 202.

The type of light beam to be irradiated is selected from various kinds of beams such as ultraviolet beam, visually recognizable beam, infrared beam, electron beam, etc. The irradiation time ranges from 5 to 100 seconds in case of exposure of 300 J/cm$^2$ by a parallel exposing unit having an ultra-high pressure mercury lamp.

As described above, through control of the irradiation time and irradiation amount of light beam, in the adhesive layer portions 203a which were uncured, only the boundary portions with the conductive layer 202 will be kept uncured and the other portions can be cured. This is because oxygen molecules present between the conductive layer 202 and the adhesive layer 203 serve to inhibit photochemical reaction of the photocurable resin constituting the adhesive layer portions 203a.

At a fourth step, as shown in FIG. 10B (c), the uncured portions of the adhesive layer 203 (the surfaces of the adhesive layer portions 203a) are removed. As an example of removing method, a water-flushing removing method can be cited. With implementation of such water-flushing removal, the uncured portions of the adhesive layer 203 and the conductive layer 202 stacked thereon are removed. As a result, there can be obtained the conductive substrate 301 including the first adhesive layer 206 having the first groove portion 211 pattern-formed on the substrate 1, the first conductive layer 208 having the first electrode pattern 207 pattern-formed on the same, and the first dummy layer 210 having the first dummy pattern 209 pattern-formed on the same.

Figure 10C:
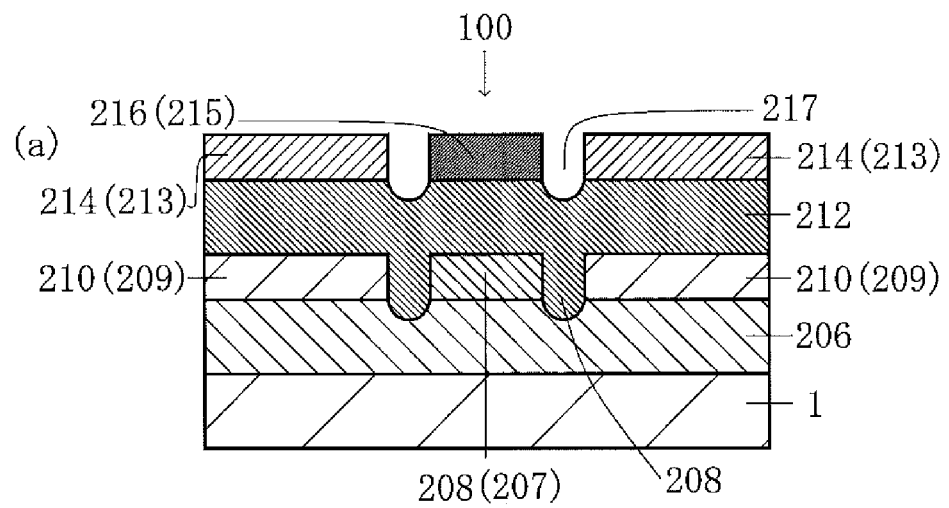
FIG. 10C is a section view illustrating manufacturing steps of the touch panel according to the present invention.
Figure 10C:
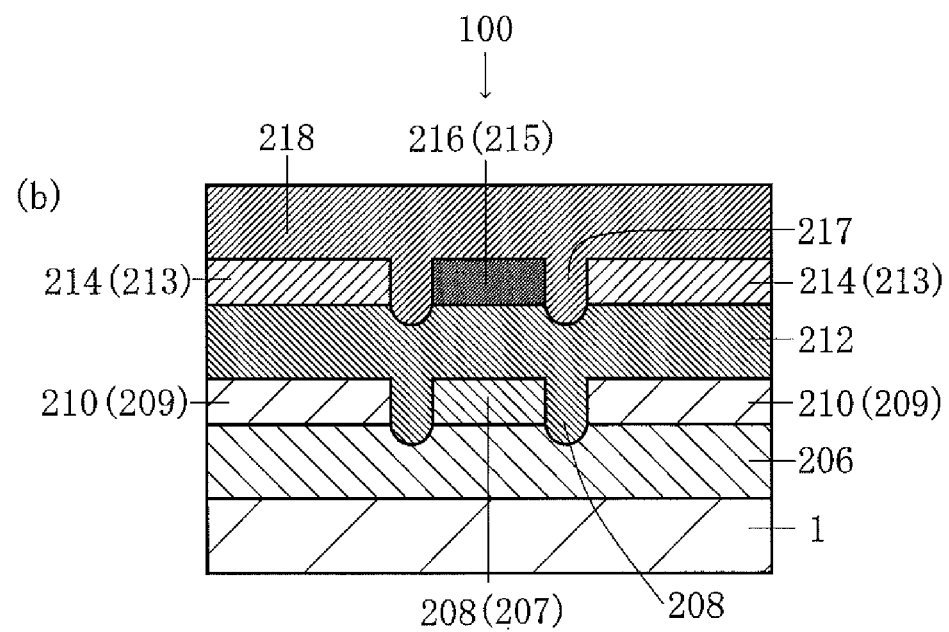
Figure 11:
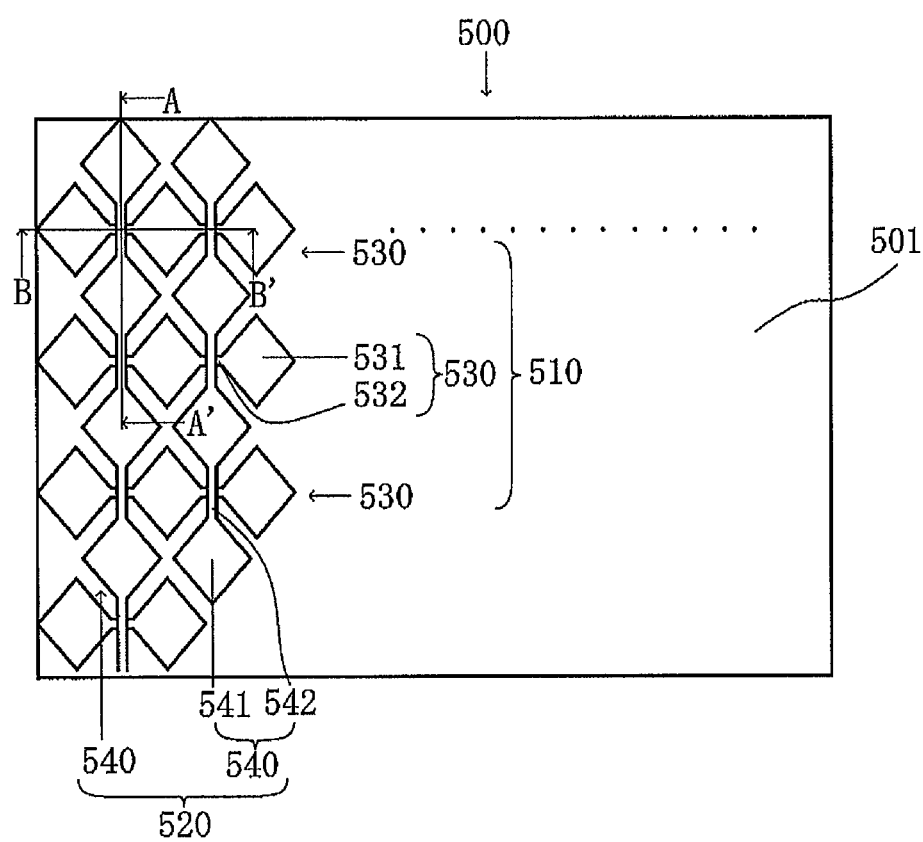
FIG. 11 is a plan view showing a conventional touch panel.
Figure 12:
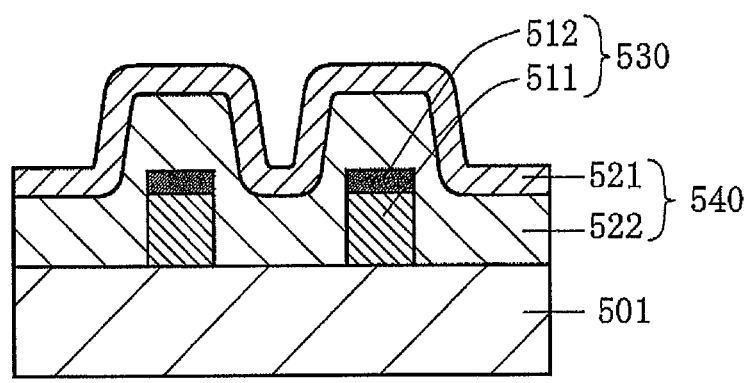
FIG. 12 is a section view along A-A' in FIG. 11.
Figure 13:
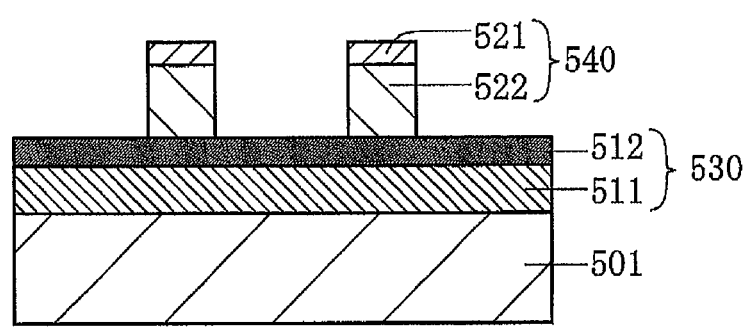
FIG. 13 is a section view along B-B' in FIG. 11.

In the subsequent process, the transfer sheet 200 is stacked on the conductive substrate 301 in such a manner that the adhesive layer 203 of the transfer sheet 200 is placed in contact with the first conductive layer 208 and the first dummy layer 210 and then, through implementation of operations similar to the first through fourth steps described above, the touch panel 100 is obtained as shown in FIG. 10C (a).

Further, after completion of the above steps, as shown in FIG. 10C (b), a sealing layer 218 can be provided on the completed touch panel.

Through the above-described steps, there can be manufactured a touch panel having less visually recognizable pattern.

DESCRIPTION REFERENCE NUMERALS/MARKS 1, 501 . . . substrate
2 . . . input region
3 . . . circumferential edge portion
4, 206 . . . first adhesive layer
5, 208 . . . first conductive layer
6, 212 . . . second adhesive layer
7, 214 . . . second conductive layer
8, 210 . . . first dummy layer
9, 216 . . . second dummy layer
10, 211 . . . first groove portion
11, 217 . . . second groove portion
20, 510 . . . X electrode
21, 207, 530 . . . first electrode pattern
22, 531 . . . first island-like electrode portion
23, 532 . . . first connecting portion
24, 520 . . . Y electrode
25, 213, 540 . . . second electrode pattern
26, 541 . . . second island-like electrode portion
27, 542 . . . second connecting portion
28 . . . connecting portion
30 . . . leading circuit
60 . . . adhesive layer
80, 209 . . . first dummy pattern
81 . . . first island-like dummy pattern
90, 215 . . . second dummy pattern
91 . . . second island-like dummy portion
92 . . . sealing layer 100, 500 ... touch panel
200 ... transfer sheet
201 ... substrate sheet
202, 512, 522 ... conductive layer
203, 511, 521 ... adhesive layer
204 ... light beam
205 ... light shielding layer
300 ... precursor conductive substrate
301 ... conductive substrate
K ... intersection portion

The invention claimed is:

1. A touch panel comprising:
a substrate;
a first adhesive layer stacked on one face of the substrate;
a first conductive layer stacked on the first adhesive layer and having a first electrode pattern;
a first dummy layer formed at a region in a same plane as the first conductive layer where the first conductive layer is absent, the first dummy layer being stacked as being spaced apart from the first conductive layer so as not to be electrically connected with the first conductive layer, the first dummy layer having a same thickness as the first conductive layer;
a second adhesive layer stacked on the first conductive layer, the first adhesive layer and the first dummy layer;
a second conductive layer stacked on the second adhesive layer and having a second electrode pattern; and
a second dummy layer formed at a region in a same plane as the second conductive layer where the second conductive layer is absent, the second dummy layer being stacked as being spaced apart from the second conductive layer so as not to be electrically connected with the second conductive layer, the second dummy layer having a same thickness as the second conductive layer;
the first electrode pattern including:
a plurality of first island-like electrode portions formed in a spaced-apart relationship with each other in a first direction on the substrate; and
a first connecting portion formed between the first island-like electrode portions which are adjacent each other in the first direction, the first connecting portion electrically interconnecting the first island-like electrode portions;
the second electrode pattern including:
a plurality of second island-like electrode portions formed in a spaced-apart relationship with each other in a second direction intersecting the first direction so as not to be overlapped with the first electrode pattern on the substrate; and
a second connecting portion formed between the second island-like electrode portions which are adjacent each other in the second direction, the second connecting portion electrically interconnecting the second island-like electrode portions over via the first connecting portion;
the first adhesive layer including a first groove portion formed at a boundary region between the first conductive layer and the first dummy layer and on a surface of the side on which the first conductive layer and the first dummy layer are stacked; and
the second adhesive layer including a second groove portion formed at a boundary region between the second conductive layer and the second dummy layer and on a surface of the side on which the second conductive layer and the second dummy layer are stacked.

2. The touch panel according to claim 1, wherein:
at the boundary region between the first conductive layer and the first dummy layer, a level difference formed by the first conductive layer, the first dummy layer and the first groove portion of the first adhesive layer ranges from 0.01 µm to 5.0 µm; and
at the boundary region between the second conductive layer and the second dummy layer, a level difference formed by the second conductive layer, the second dummy layer and the second groove portion of the second adhesive layer ranges from 0.01 µm to 5.0 µm.

3. The touch panel according to claim 2, wherein a thickness of the second adhesive layer is from 1 to 100 times as large as the level difference formed by the first conductive layer, the first dummy layer and the first groove portion.

* * * * *